United States Patent [19]

Sivachenko et al.

[11] 4,275,663
[45] Jun. 30, 1981

[54] CORRUGATED VEHICLE UNDERFRAME

[75] Inventors: Eugene W. Sivachenko, 6471 Riverside Dr., Redding, Calif. 96001; Firoze H. Broacha, Lakewood, Colo.

[73] Assignee: E. W. Sivachenko, Redding, Calif.

[21] Appl. No.: 915,435

[22] Filed: Jun. 14, 1978

[51] Int. Cl.³ .................... B61D 17/00; B61F 1/00; B62D 21/00
[52] U.S. Cl. .................... 105/413; 52/797; 105/404; 105/414; 105/420; 105/422; 296/182; 403/384
[58] Field of Search .......... 52/795, 796, 797, 798, 52/799, 800, 801; 105/406 A, 406 R, 410, 413, 414, 422, 404, 420, 407; 296/181, 182, 183, 203, 204; 403/384; 72/180

[56] References Cited

U.S. PATENT DOCUMENTS

| | | | |
|---|---|---|---|
| 1,829,508 | 10/1931 | Ditchfield | 105/410 |
| 2,172,571 | 9/1939 | Theriault | 105/407 X |
| 2,183,054 | 12/1939 | Tesseyman et al. | 105/414 |
| 2,950,788 | 8/1960 | Edgar | 52/797 X |
| 3,055,317 | 9/1962 | Flowers | 105/422 |
| 3,173,383 | 3/1965 | Eggart, Jr. | 105/422 |
| 3,185,112 | 5/1965 | Johnston | 105/422 X |
| 3,432,859 | 3/1969 | Jordan et al. | 52/797 X |
| 3,481,643 | 12/1969 | Campbell | 296/204 |
| 3,719,155 | 3/1973 | O'Leary | 105/422 |
| 3,940,965 | 3/1976 | Sivachenko et al. | 72/180 |
| 4,049,285 | 9/1977 | Chieger | 296/182 |

Primary Examiner—John P. Silverstrim
Assistant Examiner—Howard Beltran
Attorney, Agent, or Firm—Townsend and Townsend

[57] ABSTRACT

A load carrying vehicle such as a truck trailer or a railroad car has a generally flat, horizontal loading surface which is supported by an underframe which in turn is mounted to and carried by wheel assemblies, kingpin-saddle plate arrangement and the like. The underframe extends over the full length and width of the load carrying vehicle and each of its transverse cross-sections is of a substantially constant height while in a longitudinal direction the center portion of the underframe is of a relatively greater height than portions of the underframe adjacent the wheel assemblies. The underframe is constructed of a first corrugated plate in which the corrugations run longitudinal of the vehicle. A second corrugated plate is secured to the underside of the first mentioned plate and the plates are arranged so that the corrugation troughs of the upper plate are in longitudinal alignment with corrugation peaks of the lower plate to define a hollow core honeycomb pattern between the plates. Mutual contact points between the plates, e.g. contacting corrugation troughs and peaks are rigidly secured, e.g. welded to each other. The load carrying surface may be defined by the upper corrugated plate or by planking or the like attached thereto. Side walls, end walls and a roof constructed of corrugated plate can be mounted to the underframe.

10 Claims, 17 Drawing Figures

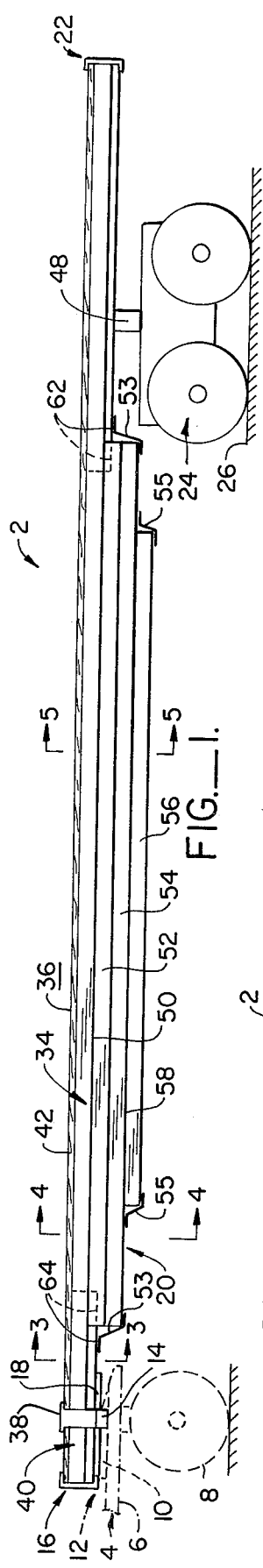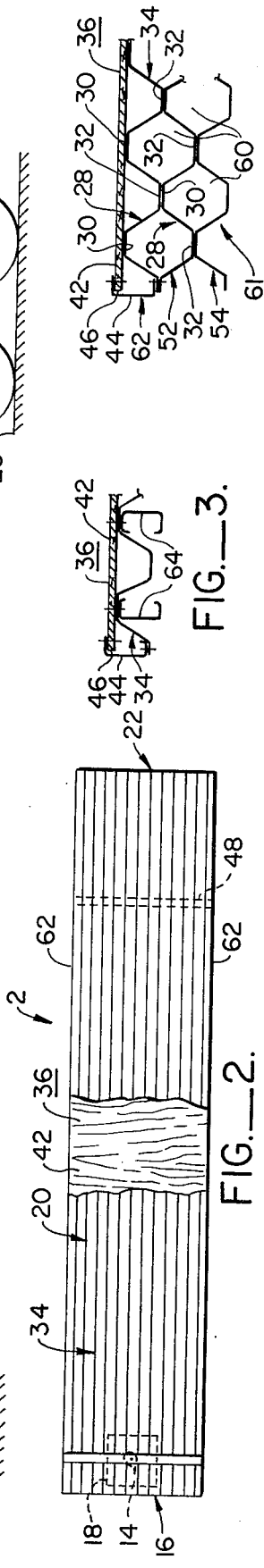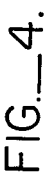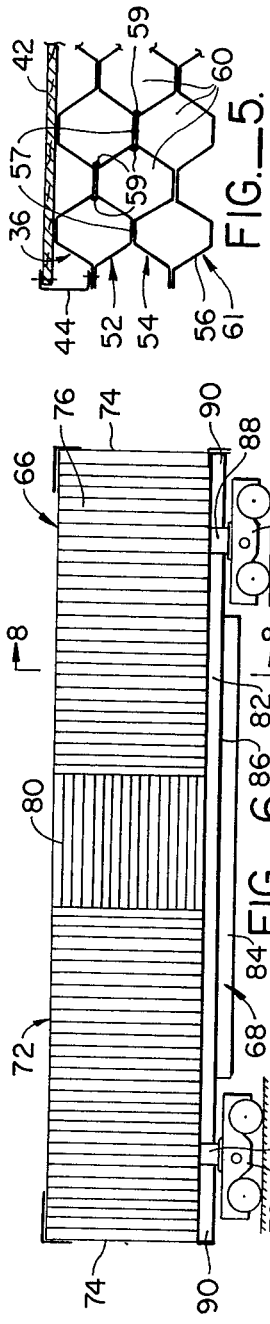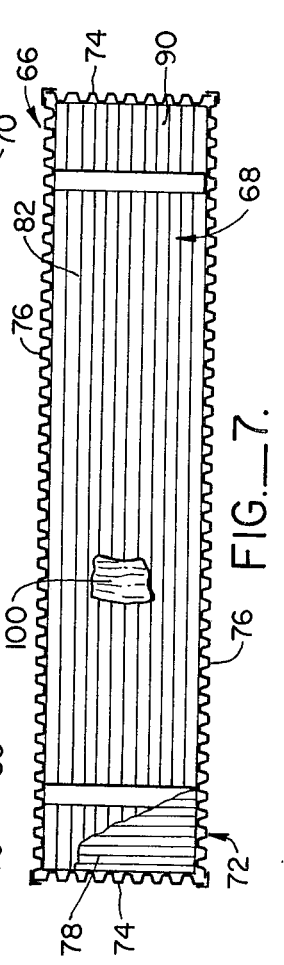

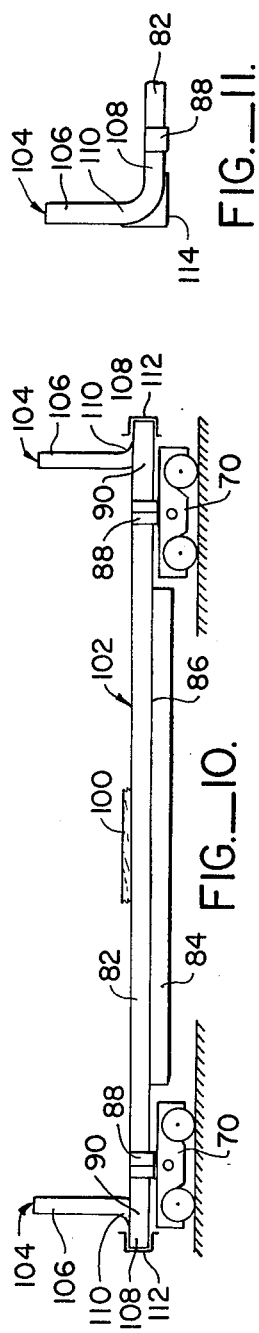
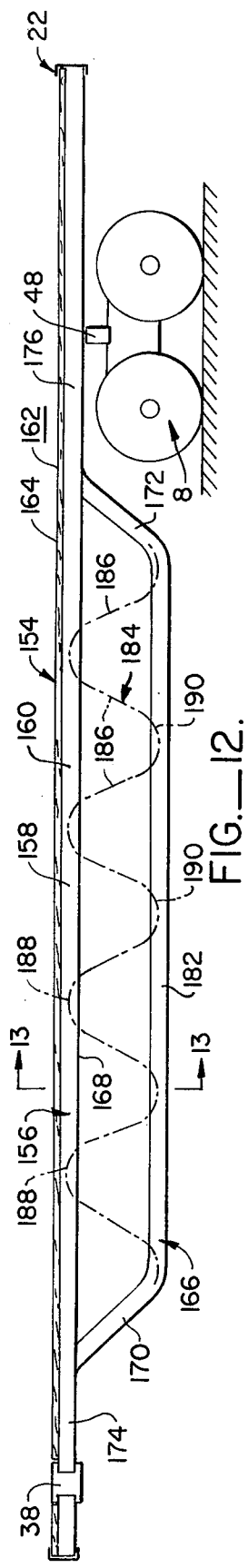
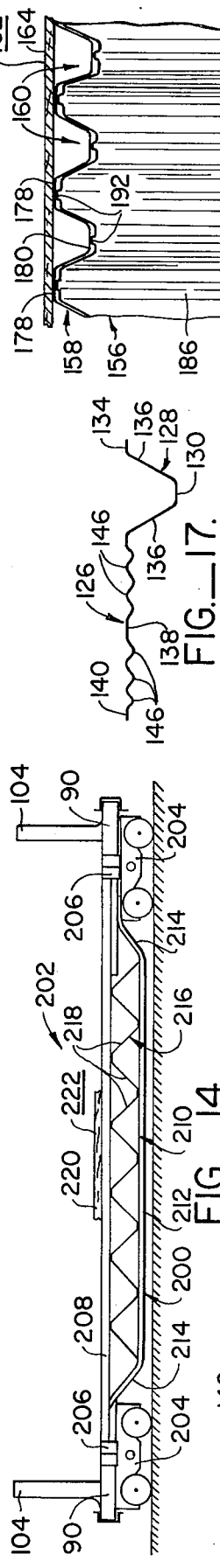
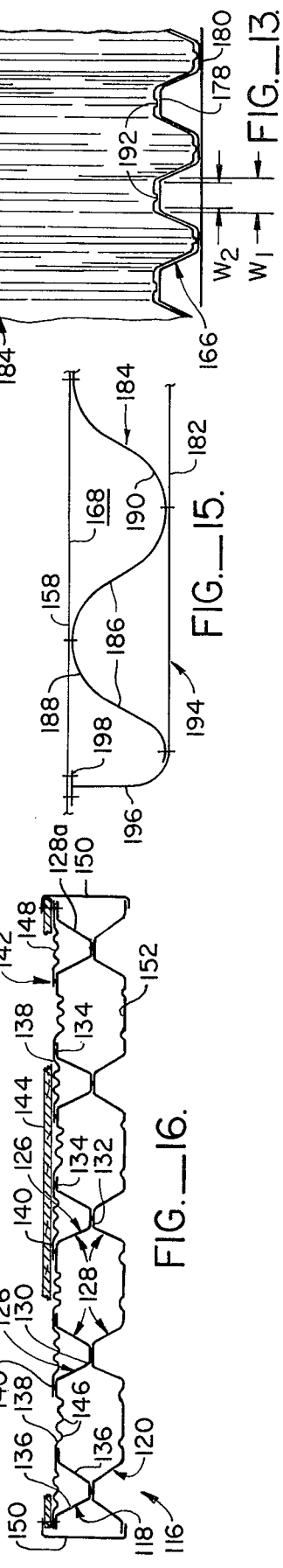

CORRUGATED VEHICLE UNDERFRAME

BACKGROUND OF THE INVENTION

Almost all goods manufactured and/or consumed in industrialized nations are loaded on and transported by railroad cars or trucks at one point during their distribution. Accordingly, the number of freight-carrying railroad cars and trucks and, in particular, semi-trailers is in the millions, representing investments of many billions of dollars.

The present invention is directed to improvements in the construction of such vehicles. For purposes of this application and the claims appended hereto the term "vehicle" means and is intended to include truck trailers (both semi-trailers and trailers having forward and aft axles), all types of railroad freight cars (such as boxcars, gondola cars, flat cars, refrigerator cars and the like) and similar vehicles intended to haul heavy loads, normally amounting to many tons at relatively high speeds over long distances, whether on roadbeds, rails, or other support surfaces (hereinafter sometimes collectively referred to as "support surfaces").

The outer appearances of such vehicles may vary widely in terms of their size, load carrying capacity, shape and intended use. Structurally, however, they are relatively similar. Generally, each such load carrying vehicle comprises an axle assembly, in the form of a pair of railroad truck assemblies for a railroad car, forward and aft axle assemblies for trailers, or a kingpin-saddle plate arrangement combined with an aft axle assembly for semi-trailers, together with a load supporting underframe mounted on top thereof to define or to carry means defining the load carrying surface. In addition, the vehicle may have front and aft bulkheads (railroad flat cars; flat bed trailers), side and end walls (railroad gondola cars, trailers) and a roof (railroad boxcars, trucks, trailers, or semi-trailers). The side walls, end walls and the roof normally do not have a load carrying capacity (other than an ability to withstand wind forces, snow loads, etc.) and are constructed relatively light, normally no stronger than is necessary to withstand the forces to which they are subjected during normal use while assuring the desired holding and/or protecting characteristics for the load carried by the vehicle.

Aside from the wheel or truck assemblies the underframe is the most important load supporting structure. It is here that a major portion of the expense of prior art vehicles of the type discussed above is incurred. Generally speaking, the underframe comprises one or more longitudinally running beams, normally arranged close to the center of the car and, projecting therefrom, a multitude of cantilevered arms, beams, plates and the like, all of which are intricately shaped and individually secured, e.g. welded or bolted to the main beam or beams. Such frames are constructed of literally hundreds of individual parts which must be individually formed, e.g. cut, stamped, bent and the like and which must thereafter be individually hand-welded to the main beam. The main beam itself is intricately shaped, frequently it is tapered so as to prevent them from interfering with the wheel assemblies, to minimize its weight and enable it to carry a maximum payload. The penalty for such a construction, however, is a great deal of costly labor which correspondingly increases the cost of the finished vehicle.

The following U.S. Patents are representative of the above-discussed overall construction of such vehicles: U.S. Pat. Nos. 2,172,571; 3,055,317; 3,185,112; and 4,049,285. The patents illustrate various attempts to construct the underframe for such vehicles. In all instances, except for the last mentioned patent, it requires the assembly of a multitude of parts. In the last mentioned patent the large number of parts is replaced with intricate, extruded aluminum floorboards which, it is believed, would not only be costly to make but would additionally be unsuited for heavy duty use as is ecountered in many truck applications and in connection with virtually all railroad applications.

Common to these prior art structures, however, is the provision of main, usually centrally located, longitudinally running support beams from which lateral extensions protrude. Thus, another characteristic for these structures is that cross-section of the underframe, in a direction perpendicular to its length, is greatest in the vicinity of the beams, normally adjacent the longitudinal center of the frame and least at the outer edges of the frame. The reason for this construction is that the ultimate weight supporting member, the longitudinally running beams, do not span the entire width of the frame and that cantilevered structures are attached to these beams to extend their effectiveness over the full width of the load carrying surface.

SUMMARY OF THE INVENTION

The present invention greatly simplifies the construction of load carrying vehicles, primarily by simplifying the construction of their underframe. Broadly speaking, a vehicle constructed in accordance with the present invention comprises an underframe which effectively extends over the full width and length of the load carrying surface of the vehicle. At any given point over its length the underframe has a substantially uniform cross-section over its full width. It is made from a corrugated plate which constitutes the primary structural element for supporting the load. The corrugated plate is defined by a plurality of longitudinally extending, side-by-side corrugations that have an overall width substantially equal to the overall width of the load carrying surface. Means, such as wheel assemblies or a kingpin-saddle plate arrangement is further provided proximate longitudinal ends of the underframe for movably supporting it on a carrying surface for the vehicle, e.g. on a road or on rails. Further, means is carried on top of the underframe for defining the loading surface of the vehicle.

While each transverse cross-section of the underframe is of a substantially constant height, one or more additional corrugated plates are secured to a portion of the uppermost corrugated plate intermediate the frame supports (e.g. the wheel assemblies or kingpin) so as to increase the strength and rigidity of the frame. The additional corrugated plates are arranged so that their corrugation peaks are longitudinally aligned with corrugation troughs of the upper corrugated plate and the aligned peaks and troughs which are in mutual contact are rigidly secured to each other, e.g. by welding them together so as to form with the corrugated plates a hollow core honeycomb pattern. The resulting frame is of a relatively very light weight, yet it has an exceedingly high strength and rigidity.

The corrugated plate or plates secured to the underside of the upper plate are of a lesser length than the upper plate so as to not interfere with the wheel assemblies or the like. Each succeeding lower corrugated plate may be shorter than the one immediately above it since it is primarily required adjacent the center of the underframe which experiences the largest bending moments when carrying a load.

To obtain the desired strength and rigidity the corrugated plates for relatively lighter applications, e.g. for trucks, trailers and semi-trailers normally have a thickness of between 0.04 to 0.06 inch, a trapezoidal corrugation profile with a minimum corrugation pitch of about 12 inches and a minimum corrugation depth of about 3 inches. It is preferred, however, that the corrugation pitch and depth are no less than 16 inches and 5½ to 6 inches, respectively, to maximize the strength of the corrugated plate, commensurate with its ability to be cold-formed from flat sheet metal stock. For heavier applications, say for railroad cars which typically must carry loads several times larger than trucks and which are further subjected to very large longitudinal forces acting in the plane of the underframe, the corrugated plate is constructed of metal having a thickness of between ⅛ to ½ inch. Further, such plate preferably has a U-shaped configuration with generally horizontal, flat corrugation peaks and corrugation troughs joined by generally vertical corrugation sides which are perpendicular to the troughs and peaks and which interconnect them. Further, for such railroad cars the corrugation pitch and depth may be as large as 21 inches and 12 inches, respectively. In all other respects, however, the corrugations and the manner in which they are assembled to define the honeycomb pattern of the frame (which may be either hexagonal in cross-section, square or shaped otherwise, depending on the particular profile employed) are the same.

In another embodiment of the invention, the upper corrugated plate defining the underframe is as above constructed, however, the second, lower corrugated plate is spaced some distance from the upper plate and a generally sinusoidally shaped, corrugated connecting member is disposed between and interconnects the two plates. The connecting member has a width substantially equal to the width of the plates and corrugations which extend in the direction of the plate corrugations and which are further sized and shaped complementarily thereto. The member defines a plurality of serially arranged, diagonally disposed webs which interconnect the upper and lower corrugated plates. As above discussed, in this embodiment of the invention the lower corrugated plate is shorter than the upper corrugated plate so as to provide clearance for the wheel assemblies or other supporting means for the frame. However, as in the earlier discussed embodiments of the invention the transverse cross-section of the underframe at any given point over its length remains constant over effectively the full width of the loading surface supported by it.

From the preceding discussion of the present invention it is apparent that the multitude of individual parts which were heretofore necessary for assembling an underframe having the desired strength and rigidity are replaced by two or three uniform parts, namely by two or more corrugated plates which are stacked one on top of the other and rigidly welded together.

The plates themselves can be inexpensively mass produced from cold-rolling flat sheet stock to give it the desired profile. By appropriately selecting the width of the flat stock and the dimensions of the corrugations, each corrugated plate may be assembled from two or more narrower corrugated plate sections by longitudinally welding these sections together with highly efficient and inexpensive automatic welding equipment. By making the corrugated plates of cold-rolled steel they can be corrugated at the site where and at the time of their use. Thus, the plate can be shipped to and stored at the manufacturing plant in that state, thereby saving valuable shipping and storage space and thereby reducing the ultimate cost of the vehicle.

Further, the corrugated plates and plate sections can be constructed of relatively high strength steel, for example, having a yield strength of about 50,000 psi, and of corrosion-resistant material which does not need the application of protective surface coatings. Such materials are commercially available. One of them, a copper bearing steel, is marketed under the trade designation COR-TEN by the United States Steel Corporation of Pittsburgh, Pennsylvania. Briefly, upon exposure to the atmosphere, these materials surface oxidize and form a self-protective coating, assuring that even after prolonged exposure to the atmosphere, the integrity of the underlying metal will remain. Accordingly, by constructing the corrugated plate for the underframe of such corrosion-resistant materials, thinner cross-section materials can be employed. Such thinner materials in turn are more readily worked and enable one, for example, to corrugate the material at a lesser cost.

The greatest cost savings, however, afforded by the present invention are encountered during the actual assembly of the underframe. The heretofore necessary manufacture of hundreds or thousands of individual parts and their hand-welding in specially designed jigs and the like have been entirely eliminated. Instead, each underframe requires no more than cutting to length a corrugated sheet of the desired width and attaching thereto one or more similarly simple corrugated sheets to attain the desired overall height of the underframe at the center of the vehicle. This significant simplification of the assembly process alone can save tens if not hundreds of hours of labor for each vehicle.

In addition, the even cross-section of the frame over its entire width eliminates stress concentrations in one or more highly stressed center beams or the like. Instead, all parts of the frame are equally stressed which enables an overall weight reduction as compared to prior art trailers, thereby further increasing the cost savings afforded by the present invention.

Still further, the hollow core honeycomb pattern formed by the underframe of the present invention can be advantageously employed as protective coverings for pipe, hoses, electrical lines and the like which must be installed on the vehicle. These protective coverings need not be specially manufactured as was normally the case in the prior art. At the same time, they exhibit such great strength as to virtually eliminate the possibility of accidental damage to such lines which helps to reduce maintenance costs and renders vehicles constructed in this manner safer as compared to prior art vehicles.

From the foregoing, it will be apparent that the present invention greatly improves the structural integrity, strength and rigidity of load carrying vehicles such as railroad cars, trucks or trailers. This is achieved with a significant reduction in the overall labor requirements for assembling such vehicles and, consequently, in the overall costs thereof.

BRIEF DESCRIPTION OF THE DRAWINGS

FIG. 1 is a simplified, side elevational view of a flat bed semi-trailer constructed in accordance with the present invention;

FIG. 2 is a plan view, on a reduced scale, of the semi-trailer shown in FIG. 1;

FIGS. 3-5 are fragmentary, cross-sectional front elevational views taken on lines 3—3, 4—4, and 5—5, respectively, of FIG. 1;

FIG. 6 is a side elevational view of a railroad boxcar constructed in accordance with the present invention;

FIG. 7 is a plan view (with the roof removed) of the railroad boxcar shown in FIG. 6;

FIG. 8 is a front elevational view, in section, and is taken on line 8—8 of FIG. 6;

FIG. 9 is an enlarged, fragmentary front elevational view illustrating details of the construction of the underframe for the railroad boxcar shown in FIG. 6;

FIG. 10 is a side elevational view of a flat bed railroad car provided with end bulkheads constructed in accordance with the present invention;

FIG. 11 is a fragmentary, side elevational view illustrating an alternative construction for the end bulkheads shown in FIG. 10;

FIG. 12 is a side elevational view of a semi-trailer constructed in accordance with another embodiment of the present invention;

FIGS. 13 is a fragmentary, front elevational view of the underframe of the semi-trailer shown in FIG. 12 and is taken on lines 13—13 of FIG. 12;

FIG. 14 is a side elevational view of a flat bed railroad car constructed in accordance with the present invention and having an underframe constructed similar to the underframe of the semi-trailer shown in FIG. 12;

FIG. 15 is a schematic, side elevational view of an alternative construction for the underframe shown in FIGS. 12 and 14;

FIG. 16 is a front elevational cross-section, taken generally along line 4—4 of FIG. 1 and illustrates a further embodiment of the present inventions; and FIG. 17 is an enlarged detail illustrating the cross-sectional profile of corrugated plate sections employed in the embodiment of the invention shown in FIG. 16.

DESCRIPTION OF THE PREFERRED EMBODIMENTS

Referring to FIGS. 1-5, the present invention is first described as embodied in a semi-trailer 2 adapted for connection to a tractor 4 which, generally speaking, includes a frame 6 carried on a wheel assembly 8 and to which is mounted a saddle plate 10 which forms part of a fifth wheel assembly 12 for connection of the semi-trailer to the tractor. As is conventional, the saddle plate has a rearwardly opening slot (not shown) to receive a kingpin 14 depending downwardly from the semi-trailer adjacent its forward end 16. To couple the tractor and the semi-trailer, the former is backed up under the latter so that the kingpin enters the slot in the saddle plate. An internal locking mechanism (not separately shown) engages the kingpin and retains it to the saddle plate while permitting relative pivotal movements between the pin and the plate about the vertical axis of the former for the navigation of curves by the rig. The vertical weight of semi-trailer 2 carried by tractor 4 is transmitted to the tractor via a downwardly facing pressure plate 18 secured to the underside of an underframe 20 of the semi-trailer.

Adjacent its aft end 22 the semi-trailer 2 includes a conventional axle-wheel assembly 24 which is mounted to the underside of the underframe 20 so that the semi-trailer, as supported by tractor 4 and fifth wheel assembly in the front and wheel assembly 24 in the rear can be moved over a supporting surface, e.g. a road surface 26.

The underframe 20 of semi-trailer 2 is constructed of multiple layers of corrugated plate. In the illustrated embodiment, and for intermediate loading requirements, e.g. truck and trailer constructions as contrasted with railroad cars which are subjected to heavy loading, the corrugated plate has corrugations 28 defined by alternating corrugation peaks 30 and corrugation troughs 32 of substantially the same dimensions and of a trapezoidal cross-section. To attain the desired high strength and rigidity, the corrugations have a corrugation pitch of at least 12 inches and preferably of 16 inches and a corrugation depth of at least 3 inches and preferably of between 5 to 6 inches. In this manner, corrugated plate can be constructed from standard flat sheet stock, such as 48 to 52-inch wide stock which can be cold-rolled into corrugated plate sections having a width of at least two full corrugations. Plate constructed in this manner has great strength and rigidity in a direction perpendicular to the plates and further enables the cold-rolling of the plate from flat steel having a yield stress of up to 50,000 psi and more without overstressing the material while it is corrugated in conventional corrugating equipment such as is disclosed, for example, in U.S. Pat. No. 3,940,965.

The corrugated plate is further arranged so that its corrugations extend in a longitudinal direction of the trailer, that is so that they run from forward end 16 to aft end 22 to take advantage of the maximum strength and rigidity of the plate. A first or upper corrugated plate 34 is provided which has a width substantially equal to the full width of the flat, horizontal loading surface 36 of the trailer. The forward end of the upper corrugated plate is tied into, that is, is rigidly secured to a transverse bolster or a cross-beam 38 by conventionally welding the plate thereto. The bolster beam overlies the fifth wheel assembly 12 and it transmits vertical loads from the trailer to the tractor. It also operates as a means for laterally distributing horizontal forces transmitted to the trailer by kingpin 14 over substantially the full width of the upper corrugated plate so as to prevent stress concentrations at the center of the plate.

A corrugated plate section 40 is normally secured, i.e. welded to the forwardly facing side of cross-beam 38 to extend loading surface 36 forward thereof. Although the forward section is separate and independent of the main upper corrugated plate 34, it can be considered as a functional extension thereof to a point forward of the cross-beam.

Placed on top of the upper corrugated plate 34 and secured thereto is a flat floor plate 42 which defines loading surface 36. In the illustrated embodiment the floor plate may comprise wood planking, plywood or the like. For certain applications, the floor plate may be made of other materials such as flat steel plate with or without a raised pattern (not shown) to reduce its slipperiness, or of other materials. A generally U-shaped fascia plate 44 is normally provided to secure lateral edges 46 of the floor plate 42 and to prevent them from being frayed or otherwise damaged during use while enhancing the aesthetic appearance of the trailer.

Referring momentarily to the righthand side of FIGS. 1 and 2, an aft cross-beam 48 is positioned above wheel assembly 24 and, in the illustrated embodiment, beneath upper chord plate 34. The upper corrugated plate 34 can therefore be extended uniformly rearwardly past the aft cross-beam over the required length. If desired, however, the aft cross-beam could be arranged in the same manner in which the forward cross-beam 38 is located, that is essentially within the horizontal projection of upper cross-plates 34.

Mounted, e.g. welded to an underside 50 of the upper chord plate are a plurality of lower chord plates. In the illustrated embodiment two intermediate corrugated plates 52 and 54 are provided which have lengths less than the length of the upper chord plate and less than the spacing between the operative portions of the fifth wheel assembly 12 and the aft wheel assembly 24 so as to not interfere with either. A fourth, lowermost corrugated plate 56 is rigidly welded to the underside 58 of corrugated plate 54. The lowermost corrugated plate is still shorter than the intermediate plates 52, 54. Generally Z-shaped cover plates 53 and 55 are placed over the forward and aft ends of the lower corrugated plates 52, 54 and 56, respectively, as illustrated in FIG. 1. The cover plates prevent the accumulation of road debris and dirt in the below described honeycomb sections 61.

In a practical embodiment in which the trailer has an overall length of 42 feet, a forward overhang (forward of bolster beam 38) of 2 feet and an aft overhang (aft of cross-beam 48) of approximately 7 feet, the intermediate lower corrugated plate 52 and 54 have lengths of approximately 27 feet while the lowermost corrugated plate has a length of approximately 19 feet. The corrugated plates are constructed of the above-discussed material in a plate thickness of approximately 0.05 inch (17-18 ga.) and they are secured to each other as is more fully described below.

Referring now particularly to FIGS. 4 and 5, each corrugated plate is laterally offset with respect to the one immediately above it so that vertically adjacent corrugated plates (e.g. plates 34 and 52 or 52 and 54) have longitudinally aligned corrugation peaks 30 and corrugation troughs 32, respectively. In this manner, each second set of corrugation peaks and troughs are in mutual contact. The areas of mutual contact between the corrugated plates are rigidly secured to each other. In the preferred embodiment the contacting corrugation troughs and peaks are spotwelded together at spaced apart points 57. Alternatively, they can be welded together with continuous welds 59 placed on one or both sides of contacting troughs and peaks or they can be secured to each other with rivets, bolts (not shown) or the like.

In this manner, the totality of corrugated plates which make up underframe 20 define, in a lateral cross-section, a honeycomb pattern 61 including multiple hollow honeycomb cores 60. In instances in which the corrugations have a trapezoidal cross-section, the cores are true honeycomb cores, i.e. they have a hexagonal shape. For purposes of this disclosure and the appended claims, the term "honeycomb core", however, is not intended to be limited to a hexagonal shape. It can equally have a square, rectangular or other cross-section, as is illustrated in FIGS. 8 and 9, for example, and discussed below, depending on the particular profile of the corrugated sheet from which the underframe is constructed.

A review of FIGS. 4 and 5 further reveals that at any given point over the length of the trailer the underframe 20 has a cross-section of a substantially constant height, that is, its height does not appreciably vary between the center of the frame and its lateral sides 62. Consequently, a load placed onto loading surface 36 is evenly carried by substantially the full width of the underframe and effectively no portion thereof is required to carry a disproportionate share of the load as is the case in instances in which a main, longitudinally running load carrying beam is provided as is common in the prior art. Thus, the height of the underframe in its lateral cross-section can be constant which greatly facilitates the ease with which such a frame, e.g. upper chord plate 36 is constructed since it is not necessary to provide tapered, cantilevered structural members in order to efficiently utilize all parts of the underframe and thereby minimize the overall weight of the trailer. Further, the maximum height of the underframe will frequently be less than if one or more main, longitudinally extending beams are provided because such beams normally require a greater height to give them the desired strength and rigidity.

It will further be observed, however, that in a longitudinal direction (FIG. 1) the height or thickness of the underframe 20 may be varied as required to give the frame the desired strength and rigidity to carry the load suspended between forward and aft cross-beams 38 and 48. This is accomplished by simply securing to the underside of the upper corrugated plate 34 one or more corrugated lower plates, such as corrugated plates 52, 54 and 56 shown in FIG. 1. The lower corrugated plates are as simple and inexpensive to manufacture and install as is the case with the upper plate. They too extend over the full lateral cross-section of the trailer as is best seen in FIGS. 4 and 5, and their length and relative (longitudinal) placement can be freely chosen and varied for each application.

Referring now briefly to FIGS. 1 and 3, the required standardization of trailer designs does not permit the extension of the lower corrugated plate 52 to cross-beams 38 and 48. Accordingly, for high load applications and in instances in which the corrugated plate is constructed of relatively thin material, it may be necessary to install short U-shaped beams 64 in the vicinity of cross-beams 38, 48 to give the upper chord plate 34 sufficient shear strength and rigidity. Alternatively, the upper corrugated plate may be constructed of heavier wall thickness material. The selection of one or the other alternative normally depends on the particular construction of the trailer, its load capacity, the material strength, the relative cost of material, etc.

The remainder of the trailer (not illustrated in FIGS. 1-5) is conventionally constructed. Thus, the trailer may comprise a flat bed trailer (as shown) but may be fitted with suitable tie-down hardware (not shown), it may be provided with fore and aft bulkheads (not shown), side walls (not shown) or it may be fully enclosed (not shown).

Referring now to FIGS. 6-9, the application of the embodiment of the invention illustrated in FIGS. 1-5 to railroad cars is described. The major difference in railroad and trailer construction, aside from differences in their respective sizes, are the usually much greater payloads that are carried by railroad cars.

The illustrated railroad car is a boxcar 66 and it comprises an underframe 68 to which are mounted railroad truck assemblies 70 adjacent the respective ends of the car. Mounted on top of the underframe is a housing 72 generally defined by end walls 74 which interconnect spaced apart, lateral side walls 76, and a roof 78 which encloses the interior space of the housing. Each side wall includes a sliding door 80 to provide access to the interior of the car. Other equipment normally found on railroad cars, such as couplers, draft gear, safety appliances and air brake equipment is not shown in the drawing.

The underframe 68 again comprises an upper corrugated plate 82 and at least one lower corrugated plate 84 rigidly secured, e.g. welded to an underside 86 of the upper corrugated plate. The upper corrugated plate extends between transverse bolster beams 88 to which the truck assemblies 70 are mounted. The bolster beams extend over the full transverse width of the railroad car and the respective ends of the upper corrugated plate are securely welded to the sides of the bolster beams. End extensions 90 of the upper corrugated plate extend the underframe forward and aft, respectively, of the truck assemblies. Normally, the end extensions are constructed identically to the main part of the upper corrugated plate as far as their width, height, profile and material thickness is concerned.

The lower corrugated plate again has the same cross-sectional width as the upper corrugated plate but a lesser length, that is its length is less than the spacing between truck assemblies 70 so as to not interfere with their operation while giving the underframe the desired strength and rigidity midway between the truck assemblies.

As is best seen in FIGS. 8 and 9, each corrugated plate is again defined by longitudinally extending corrugations 92 which define alternating corrugation peaks and corrugation troughs 94 and 96, respectively. To enhance the strength and rigidity of the corrugated plate, the profile of the corrugations is generally rectangular so that the corrugation peaks and troughs are defined by essentially parallel, flat plate segments which are interconnected by parallel, upright corrugation side walls 98 which are generally perpendicular to the peaks and troughs. The upper and lower corrugated plates 82, 84 are laterally offset by one-half pitch so that the corrugation peaks and troughs of the upper plate are in opposing relation to corrugation troughs and peaks of the lower plate. Metal-to-metal contact is thereby established between the corrugated plates where corrugation troughs of the upper plate meet corrugation peaks of the lower plate. The plates are secured to each other, preferably by welding them but alternatively by bolting, riveting, etc. them to each other at areas of mutual contact as described above.

Aside from differences in the construction of the underframe to enable it to carry the much heavier load normally placed on railroad cars, it is quite similar to the trailer underframe 20 shown and described in connection with FIGS. 1-5. Underframe 68 again has an essentially constant height at each lateral cross-section of the underframe while in a longitudinal direction the addition of one or more lower corrugated plates provides the frame with the desired strength and rigidity to support loads while it is structurally suspended between bolster beams 88 of the railroad car.

As a practical example, for a 70-ton boxcar having an overall length of 50½ feet and a center spacing between the bolster beams 88 of approximately 42 feet, the corrugations have a corrugation pitch of about 21 inches, a corrugation depth of about 12 inches and a wall thickness of about ¼ inch when constructed of material having a yield stress of at least 50,000 psi.

Placed on top of upper corrugated beam 82 is a floor plate 100, normally one inch wood planking, and the boxcar housing. In a preferred embodiment of the invention, the housing is constructed of the above-discussed 16 inch by 6 inch trapezoidal corrugations (employed for the construction of the underframe of semitrailer 2 shown in FIG. 1). It normally has a material thickness substantially less than that of the underframe to render the housing relatively lightweight yet very strong and rigid so that it can readily withstand the rough handling to which it is subjected in normal railroad operations.

FIGS. 10 and 11 illustrate the present invention as incorporated in a railroad flat car 102. It differs from the boxcar 66 shown in FIGS. 6-9 only insofar as the boxcar housing is deleted. In all other respects, especially in regard to the construction of underframe 68 the flat car is identical to that shown in FIGS. 6-9. Thus, the flat car underframe is carried by a pair of spaced apart railroad truck assemblies 70 which are secured to bolster beams 88. The underframe itself is constructed of at least one upper corrugated plate 82 and, normally, at least one lower corrugated plate 84 secured to the underside 86 of the upper plate and having a length both less than the length of the upper plate and less than the spacing between the truck assemblies 70. Also provided are forward and aft end extensions 90 which are constructed identically to the main part of the upper corrugated plate as far as their width, height, profile and material thickness are concerned. Finally, the upper surface of the upper corrugated plate carries a flat floor plate 100 which defines the loading surface for the flat car.

Although the flat car can remain entirely flat, it is frequently desired to provide it with end bulkheads 104. In accordance with the present invention the end bulkheads are made of corrugated plate which has corrugations that are compatible with the corrugations of the upper chord plate 82 in general and its end sections 90, in particular. Preferably, the end bulkheads have an L or J shape and they are defined by first and second vertical and horizontal bulkhead sections 106, 108, respectively, which are interconnected by a third, continuously curved corrugated plate section 110 which is preferably integrally constructed with the first and second sections. To enable the proper nesting of the bulkheads, the sections are chosen so that the spacing between corrugation side walls 98 (see FIG. 9) is slightly greater or smaller, as the case may be, than the corresponding corrugation side walls in the end sections 90 to enable the bulkhead to drop into and nest in the corrugations of the end section. The second, horizontal bulkhead section is suitably tied into the end section 90 as by welding, bolting, riveting or the like it thereto. An end cap 112 having a generally hatshaped configuration may be placed over the nested ends of horizontal bulkhead section 108 and upper corrugated plate end section 90.

FIG. 11 illustrates an alternative embodiment of the invention in which the orientation of the second, horizontal bulkhead section 108 is reversed so that it faces towards bolster beam 88. The construction of the bulkhead remains the same but this installation permits the utilization of substantially the whole length of the flat car 102 for loading goods thereon. An end sill 114 may be provided to close off the aligned end of end section 90 and bulkhead 104.

Referring to FIGS. 16 and 17, in another embodiment of the present invention, the upper corrugated plate 118 of an underframe 116 and a lower corrugated plate 120, are constructed of individual, wide flange corrugated plate sections 126, each of which defines a generally trapezoidal corrugation 128 which runs longitudinal of the trailer and which defines a corrugation trough 130 (for the upper corrugated plate 118) or, when inverted, a corrugation peak 132 in lower corrugation plate 120. A first, relatively, narrow, horizontally oriented flange 134 projects from one of the slanted corrugation sides 136 and a second, horizontally disposed relatively wide flange 138 projects from the other slanted corrugation side 136.

The upper corrugated plate 118 is formed by arranging several (e.g. five as illustrated in FIG. 16) corrugated plate sections 126 side-by-side so that an outboard end portion 140 of each wide flange 138 overlies the next adjacent corrugation 128 and further overlies a narrow portion of the wide flange of the next adjacent corrugation. The overlapping portions of the corrugated sections are secured to each other, preferably by spot or continuously welding them together with automatic welding equipment, so as to define the continuous, corrugated plate 118. It will be observed that the plate, when so constructed, has a flat, uninterrupted upper surface 142 onto which load can be directly placed or which may receive a flat floor plate 144 in the above-described manner. An added advantage of this construction is the fact that the upper corrugated plate, and in particular the totality of wide flanges 138 define a horizontal web capable of withstanding substantial lateral forces acting in a horizontal plane.

The wide flanges 138 may be provided with relatively shallow and narrow grooves 146 so as to enhance their rigidity. Further, it will be noted that one of the outermost corrugations, e.g. the corrugation 128a at the righthand side of FIG. 16 receives a short, flat plate 148 (which may include shallow grooves 146) since there is no wide flange 138 to the right of that corrugation.

Generally U-shaped side channels 150 may be placed over the lateral edges of the corrugated plates and the floor plate 144 (if any) to prevent a fraying of either and to enhance the aesthetic appearance of the trailer.

The lower corrugated plate 120 may be constructed of the same corrugation sections or, as is illustrated in FIG. 16, of an alternate corrugated profile in which the corrugation peaks 132 have the same profile (but inverted) as the corrugation troughs 130 of the upper corrugated plate 118. The corrugation troughs 152, however, are relatively wider than the corrugation peaks of the lower corrugated plate so as to dimensionally conform them to the peaks and troughs of the upper corrugated plate and to thereby define the earlier discussed hollow core honeycomb pattern for the underframe 116. It should be noted that in the illustrated embodiment, the honeycomb core pattern is irregular, the core pattern being elongated hexagons. If more than one lower plate is used, the core patterns defined by them will have a compound cross-section.

In all other respects the underframe 116 is constructed and functions in the same manner as the underframe 20 shown in FIG. 1 or the underframe 68 shown in FIG. 6. Thus, the upper corrugated plate extends fully between the bolster beams (not shown in FIGS. 16 and 17) and normally project beyond the bolster beams while the lower corrugated plate 120 has a lesser length both to prevent an interference with wheel-axle assemblies and/or fifth wheel assemblies (not shown in FIGS. 16, 17) and to only apply additional lower corrugated plates where they are required from a structural point of view, that is towards the center of the trailer between its forward and aft points of support.

Referring now to FIGS. 12 and 13, in another embodiment of the invention, a semi-trailer 154 includes an underframe 156 which is constructed slightly different from that shown in FIG. 1, for example, but which attains the same advantages. The trailer again includes an aft wheel assembly 8 and a transverse, forward bolstered beam 38 from which the kingpin (not shown) of a fifth wheel assembly (not shown) depends. As in the embodiment of the invention shown in FIG. 1, the wheel assembly is mounted to an aft transverse crossbeam 48 located forward of the aft trailer end 22 and normally disposed beneath an upper corrugated plate 158 of underframe 156.

The upper corrugated plate 160 is again constructed of multiple, parallel, longitudinally extending corrugations and it extends over the full width of the trailer's loading surface 162, normally defined by a flat floor plate 164 placed on top of and secured to the upper side of the upper corrugated plate 158. The underframe also includes a lower corrugated plate 166 which is spaced some distance below an underside 168 of the upper plate 158, and which has a length less than the length of both the upper corrugated plate and the spacing between the fifth wheel assembly (not shown in the FIG. 12) and the aft wheel assembly 8. The forward and aft ends of the lower corrugated plate are defined by upwardly and forwardly and rearwardly, respectively, inclined, slanted end sections 170, 172 which terminate in horizontal ends 174 and 176, respectively. The ends are nested in the corrugations 160 of the upper corrugated plate 158 as is more fully described below.

Both the upper and the lower corrugated plates 158, 166 have longitudinally running corrugations defined by alternating corrugation peaks 178 and corrugation troughs 180 of substantially the same dimensions and, in the illustrated embodiment, the corrugations have a trapezoidal profile as is shown in FIG. 13. In a presently preferred embodiment the corrugations have a trapezoidal profile, a pitch of at least about 16 inches and a corrugation depth of at least about 5 inches and preferably of between 5½ to 6 inches. In this manner, the corrugated plates 158, 166 can be constructed from standard flat sheet stock, such as 48 or 52 inch wide stock which yield at least two full corrugations. As a result, the plates have great strength and rigidity in a direction perpendicular to them while enabling the cold-rolling of the plate from flat steel having the above-discussed yield stress of up to 50,000 psi or more without overstressing the material while it is corrugated in conventional equipment.

Disposed between the upper and lower corrugated plates 158, 166 and within the horizontally disposed center section 182 of the lower plate (intermediate slanted ends 170, 172) is a sinusoidally undulated connecting member 184 defined by a plurality of serially arranged, diagonally disposed webs 186 which are interconnected by curved upper and lower crown sections 188 and 190, respectively. The connecting member 184 is also constructed of corrugated plate having corrugations complementary to those of the upper and lower corrugated plates 158, 166 and having a width substantially equal to that of the upper and lower plates so as to define an underframe which has a constant height and width at any given cross-section thereof.

To effect the proper seating between the upper and lower corrugated plates 158, 166 and the upper and lower cross-sections 188, 190 of connecting member 184, it is normally necessary to take into consideration the material thickness "t" of the corrugated plates and the connecting member. In accordance with one embodiment of the invention, the corrugations are formed so that the base width "W1" and "W2" (see FIG. 13) of the corrugation peaks and valleys 178, 180 alternatingly differ. In the presently preferred embodiment of the invention, the difference between "W1" and "W2" is about one plate thickness "t" so that the corrugation peak and valley base widths alternatingly differ by approximately one material thickness. As a practical approximation the base widths may, for example, differ by 3/16 inch, which can accommodate the nesting of corrugations having material thicknesses of ¼ inch to ¼ inch, ¼ inch to 14 ga., or 14 ga. to 14 ga. The corrugation pitch and depth, however, remain unchanged.

Alternatively, one of the corrugated plates 158, 166 and of the connecting member 184, and preferably the latter can be provided with raised bosses or dimples 192 which have a generally circular configuration and which are located at the nadir and zenith points of the crown sections 188, 190. The corrugated plates 158, 166 and the connecting member 184 can be sandwiched so that their corrugations nest and metal-to-metal contact is established between the raised bosses 192 and the opposing corrugation peaks and troughs of the upper and lower corrugated plates. The plates and the sinusoidal connecting member are then suitably rigidly secured to each other by welding them together or by connecting them with bolts, rivets (not shown) or the like to assure a firm connection between them.

In a practical embodiment of the invention in which the corrugated plates and the sinusoidal connecting members are constructed of a material having a thickness of no more than ¼ inch, the bosses 192 project past the curved periphery of the respective crown sections by about 5/16 inch.

In the presently preferred embodiment of the invention, the sinusoidal connecting member 184 is continuous, that is it is made from a single length of initially straight corrugated plate which is undulated by placing it in appropriate machinery to form the alternating diagonal webs 186 and the upper and lower crown sections 188 and 190. If preferred, due to the available length of corrugated plate, forming machinery and the like, the connecting member may be assembled from serially arranged generally L-shaped, V-shaped or multiple Z-shaped sections. In such an event, joints (not separately shown in the drawings) between such sections are preferably placed midway between the corrugated plates 158 and 166.

Referring momentarily to FIG. 15, as an alternative to the construction of underframe 156 shown in FIG. 12, the underframe for the semi-trailer and in particular, its lower corrugated plate 194 may be constructed so that instead of the slanted end section 170, 172 shown in FIG. 12 the lower chord plate is bent approximately 90° to define a substantially vertical end section 196 which may terminate in an end flange 198 that is rigidly connected, e.g. bolted or welded to the underside 168 of the upper corrugated plate 158. The vertical end section 196 is preferably integrally constructed with the horizontal center section 182 of the lower corrugated plate 166. If advantageous in a particular application, however, the end section may be separately constructed and secured to the lower corrugated plate by nesting the respective corrugations and bolting, welding or the like them to each other. In all other respects the embodiment of the invention shown in FIG. 15 is constructed and functions in the same manner as the embodiment shown in FIGS. 12 and 13.

Referring now to FIG. 14, the essentially same construction of an underframe 200 as is illustrated in FIG. 12 in connection with a semi-trailer is shown used for the underframe for a railroad flat car 202. The underframe of the railroad car is again supported by spaced apart aft and forward railroad truck assemblies 204 which are secured to transverse bolster beams 206. An upper corrugated plate 208 spans the distance between and is welded or otherwise rigidly secured to the bolster beams 206. End sections 90 project forward and aft of the respective bolster beams as an effective extension of the upper corrugated plate. End bulkheads 104 constructed as above-described and illustrated in FIGS. 10-11 may be anchored to the end sections.

Disposed below and spaced some distance beneath the underside of the corrugated plate is a lower corrugated plate 210 which includes a horizontal center section 212 tied to upwardly slanted end sections 214 which in turn terminate in generally horizontally disposed ends (not separately shown) nested within the corrugations of the upper corrugated plate and securely attached thereto by welding, for example. Disposed between the upper and lower corrugated plates is a generally sinusoidally undulated connecting member 216 which has serially arranged diagonally disposed webs 218 interconnected by the above discussed upper and lower curved crown sections. Placed on top of the upper corrugated plate is the earlier discussed flat floor plate 220 which defines loading surface 222.

The details of construction of underframe 200 are as above-described in connection with the semi-trailer shown in FIG. 12. Preferably, the corrugated plates 208, 210 and the sinusoidal connecting member have like corrugations of a generally trapezoidal cross-section and they are constructed to assure a nesting of the corrugations with metal-to-metal contact at the respective corrugation peaks and troughs. Although the material thickness of the corrugated plates and of the sinusoidal connecting member is typically larger for railroad cars than necessary for semi-trailers, they are otherwise structurally and functionally identical. In connection with the underframe construction illustrated in FIGS. 12-15, it will be observed that the loading surface 162, 222 is again supported by an underframe which extends over the full width and length of the loading surface. Moreover, as is the case with the underframes shown in FIGS. 1-11, the underframes shown in FIGS. 12-15 have a cross-section of a constant height, that is, the height does not vary between the center of the frame and its lateral sides at any given cross-section over the length of the trailer although some of the cross-sections will be relatively higher or lower depending on where a particular cross-section is taken since in the longitudinal direction the height or thickness of the underframe varies as required to give it the desired strength and rigidity for suspending the load between the forward and aft cross or bolster beams. Consequently, a load placed onto loading surface 162, 222 is evenly carried over the full width of the underframe and substantially no portion thereof is required to carry a disproportionate share of the load as is the case in instances in which a main, longitudinally running load carrying beam is provided as is common in the prior art.

We claim:

1. A vehicle for carrying a load on a substantially flat and generally horizontal loading surface having a given width and length, the vehicle comprising: an underframe extending over substantially the full width and length of the surface and having a substantially uniform cross-section over substantially its full width, the underframe comprising a corrugated plate including a plurality of longitudinally extending, side-by-side corrugations having an overall width substantially equal to the overall width of the surface; means proximate longitudinal ends of the underframe for movably supporting the underframe on a carrying surface for the vehicle; attaching means carried by the underframe for operatively interconnecting the underframe with the movably supporting means; means carried by the underframe for defining the loading surface, the corrugated plate defining substantially the only structural vertical and longitudinal load transmitting and supporting element between the movably supporting means.

2. A vehicle according to claim 1 including a second corrugated plate which is spaced apart from and substantially parallel to the first mentioned corrugated plate, the corrugated plates having substantially like dimensions and aligned corrugations, and a generally sinusoidally shaped, corrugated connecting member disposed between the plates, having a width substantially equal to the width of the plates and having corrugations which extend in the direction of the plate corrugations and which are sized and shaped complementarily thereto, the member defining a plurality of serially arranged, diagonally disposed webs interconnecting the upper and lower corrugated plates, and means for rigidly securing the plates and the member to each other at points at which they contact.

3. A load carrying vehicle comprising in combination: spaced apart moving means adapted to move the vehicle over a support surface; an underframe having a given width and a length at least equal to the spacing between the moving means, the underframe comprising a fabricated profile made of corrugated plate defined by longitudinally extending, parallel corrugations, the underframe having at any point over its length a substantially constant height in a direction perpendicular to the corrugations, a portion of the underframe proximate its longitudinal center further having a height which is greater thant he height of the underframe adjacent the moving means, the corrugated plate defining substantially the only structural vertical and longitudinal load transmitting and supporting element between the moving means; attaching means secured to the underframe for connecting the moving means to the underframe; and means carried on an upper side of the underframe for defining a loading surface onto which a load to be carried by the vehicle can be placed.

4. A load carrying vehicle comprising in combination an axle-wheel assembly for movably supporting a first end of the vehicle; means proximate a second end of the vehicle for movably supporting th second end; an underframe for the vehicle disposed generally above the assembly and the movable supporting means, spanning at least the distance therebetween, and having a given width which is less than the length of the vehicle, the underframe being constructed of at least an upper and a lower corrugated plate, the upper plate being continuous and integral over its entire length and longer than the lower plate and the lower plate having a length less than the spacing between the assembly and the moving means, the upper plate defining substantially the only structural element of the underframe connected to the axle-wheel assembly and the movably supporting means and the corrugated plates defining substantially the only vertical and longitudinal load transmitting and supporting elements between the assembly and the movably supporting means, each plate defining multiple side-by-side, longitudinally extending corrugations, the plates having substantially identical widths; means for rigidly securing the plates to each other so as to define therebetween a longitudinally extending open cell honeycomb pattern, the cells being substantially evenly arranged over the full width of the plates and the full common length of the plates; and means carried by the upper plate for forming a load receiving and carrying surface for the vehicle.

5. A truck trailer for carrying a load on a loading surface of the trailer comprising an axle-wheel assembly for movably supporting a first end of the trailer; means proximate a second end of the trailer for movably supporting the second end; an underframe spanning the distance between the assembly and the movably supporting means for supporting the load; and means operatively connecting the assembly and the movably supporting means with the underframe; the underframe comprising as its structural, substantially only supporting member for the trailer vertical and longitudinal load transmitting and an upper plate attached to the connecting means, the upper plate having a horizontal extent substantially equal to that of the loading surface and a plurality of parallel, longitudinal, side-by-side corrugations defined by alternating corrugation peaks and corrugation troughs extending over substantially the entire distance between the connecting means; at least one lower plate having a width coincident with that of the upper plate, the lower plate also including a plurality of parallel, longitudinal, side-by-side corrugations which are parallel to the corrugations of the upper plate, ends of the lower plate terminating at points short of the assembly and the movably supporting means, the corrugations of the plates being laterally offset with respect to each other by about one-half corrugation pitch so as to longitudinally align corrugation peaks and corrugation troughs of the upper plate with corrugation troughs and corrugation peaks of the lower plate, the upper and lower plates being further constructed of cold-rolled metal made from flat sheet metal stock; and means for rigidly interconnecting the upper plate and the lower plate at at least multiple points located at areas of mutual contact between the plates so as to intergrate the plates into a unitary, load supporting underframe for the trailer having a substantially even strength over its width.

6. A truck trailer for carrying a load on a loading surface of the trailer comprising an axle-wheel assembly for movably supporting a first end of the trailer; means proximate a second end of the trailer for movably supporting the second end; an underframe spanning the distance between the assembly and the movably supporting means for supporting the load; and means for operatively connecting the assembly and the movably supporting means to the underframe; the underframe comprising as its substantially only structural, load supporting member for the trailer an upper plate attached to the connecting means and having a horizontal extent coincident with that of the loading surface, the upper plate being, longitudinally, of an integral construction and includes a plurality of longitudinal, parallel, side-by-side corrugations defined by alternating ccorrugation peaks and corrugation troughs extending over substantially the entire distance between the connecting means; a lower plate having a width substantially identical to that of the upper plate, the lower plate having a length less than the distance between the connecting means, a plurality of side-by-side corrugations which extend in the direction of the corrugations of the upper plate and which have a profile complementary to that of the corrugations of the upper plate, the lower plate being further spaced apart from the upper plate; and means rigidly interconnecting the lower plate with the upper plate so as to structurally integrate the upper and lower plates into a unitary, vertical and longitudinal load transmitting and supporting underframe for the trailer having a substantially even strength and rigidity over its full width.

7. A railroad car comprising in combination: first and second, spaced apart railroad truck assemblies; an underframe having a length greater than the spacing between the truck assemblies and defined by at least an upper corrugated plate and a lower corrugated plate of substantially like widths, the upper plate being longer than the lower plate and the lower plate being shorter than a spacing between the truck assemblies, each plate being defined by a plurality of longitudinally extending, side-by-side corrugations having alternating corrugation peaks and corrugation troughs, the plates being arranged relative to each other so that corrugation troughs of the upper plate are in alignment with corrugation peaks of the lower plate so as to establish contact between them; means for rigidly securing aligned, contacting corrugation troughs of the upper plate and corrugation peaks of the lower plate to each other; a transversely extending bolster beam secured to the upper plate adjacent ends thereof, the spacing between the bolster beams being selected to coincide with the desired center spacing between the truck assemblies; the upper and lower plates defining substantially the only vertical and longitudinal load transmitting and supporting, structural elements between the bolster beams; and a floor plate secured to an upper side of the upper plate for receiving and supporting a load to be carried by the car.

8. A railroad car according to claim 7 including an upwardly extending bulkhead disposed adjacent each end of the underframe, each bulkhead being constructed of a corrugated plate having corrugations complementary to the corrugations of the upper plate, extending generally in the same direction and being longitudinally aligned therewith, and means for securing a lower end of each bulkhead to the upper corrugated plate.

9. A railroad car according to claim 8 wherein the bulkhead comprises a first, generally vertical section, a second, generally horizontal section and an intermediate section defined by a continuous curvature of the corrugated plate, the third section being integrally constructed with the first and second sections and interconnecting the latter with each other, the second section being placed on top of the upper plate and arranged so that its corrugations nest in the corrugations of the upper plate, and wherein the securing means comprises means for rigidly securing the second section to the upper plate.

10. A railroad car for carrying a load on a loading surface of the car comprising first and second spaced apart railroad truck assemblies proximate first and second ends of the car for movably supporting the car; an underframe spanning the distance between the truck assemblies for supporting the load; and means for operatively connecting the truck assemblies to the underframe; the underframe comprising as its substantially only structural, vertical and longitudinal load transmitting and supporting member for the car an upper plate attached to the connecting means and having a horizontal extent coincident with that of the loading surface, the upper plate including a plurality of parallel, longitudinal, side-by-side corrugations defined by alternating corrugation peaks and corrugation troughs extending over substantially the entire distance between the connecting means; a lower plate having a width substantially identical to that of the upper plate, the lower plate having a length less than the distance between the connecting means, a plurality of longitudinal, side-by-side corrugations which extend in the direction of the corrugations of the upper plate and which have a profile complementary to that of the corrugations of the upper plate, the lower plate being further spaced apart from the upper plate; and means rigidly interconnecting the lower plate with the upper plate so as to structurally integrate the upper and lower plates into a unitary, load supporting underframe for the car having a substantially even strength and rigidity over its full width.

* * * * *